United States Patent
Tachino

(10) Patent No.: US 8,295,140 B2
(45) Date of Patent: Oct. 23, 2012

(54) RECORDING AND REPRODUCING APPARATUS AND LASER DRIVING PULSE ADJUSTING METHOD

(75) Inventor: Ryuya Tachino, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/151,608

(22) Filed: Jun. 2, 2011

(65) Prior Publication Data

US 2011/0317533 A1    Dec. 29, 2011

(30) Foreign Application Priority Data

Jun. 29, 2010  (JP) ................................ 2010-147451

(51) Int. Cl.
*G11B 7/0045*  (2006.01)
(52) U.S. Cl. .................................. 369/59.12; 369/59.11
(58) Field of Classification Search .................... None
See application file for complete search history.

(56) References Cited

U.S. PATENT DOCUMENTS

| | | | | |
|---|---|---|---|---|
| 6,480,449 B1 * | 11/2002 | Narumi et al. | ............ | 369/47.53 |
| 7,715,294 B2 * | 5/2010 | Tamaki et al. | ............ | 369/59.12 |
| 8,134,900 B2 * | 3/2012 | Sagara et al. | ............ | 369/59.12 |
| 2011/0007617 A1 | 1/2011 | Tachino et al. | | |

\* cited by examiner

*Primary Examiner* — Joseph Feild
*Assistant Examiner* — Parul Gupta
(74) *Attorney, Agent, or Firm* — Oblon, Spivak, McClelland, Maier & Neustadt, L.L.P.

(57) ABSTRACT

A recording and reproducing apparatus includes: an optical head unit irradiating a laser beam on an optical recording medium and performing writing and readout of information represented by marks and spaces on the medium; a laser-driving-pulse generating unit generating and supplying a laser driving pulse to the head unit, and causing the head unit to execute laser beam irradiation; an evaluation-value measuring unit measuring an evaluation value representing an error of an edge position of the mark; and a control and calculating unit causing the apparatus to separately execute, concerning mark lengths to be adjusted among mark lengths of the laser driving pulse, for each set of mark lengths grouped in advance, trial writing with shift amounts of edge positions of a laser driving pulse concerning the lengths belonging to the set changed, causing the apparatus to execute readout of a signal recorded by the execution of the trial writing, causing the measuring unit to measure an evaluation value under setting of the respective shift amounts, and obtaining an optimum edge shift amount of the laser driving pulse for each of the lengths to be adjusted.

6 Claims, 8 Drawing Sheets

FIG.2
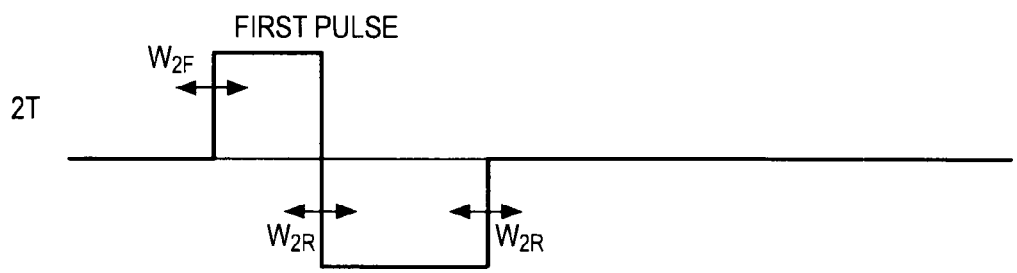
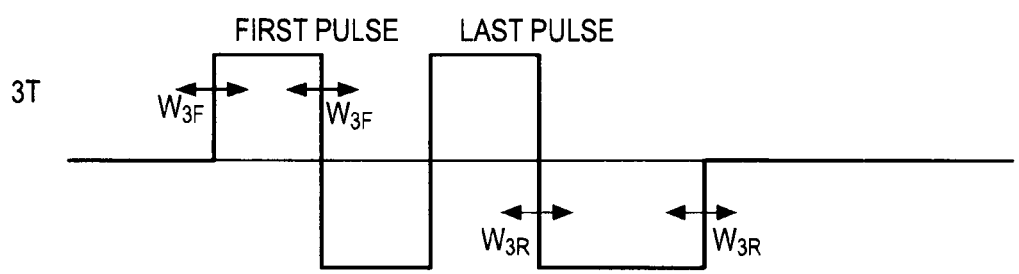
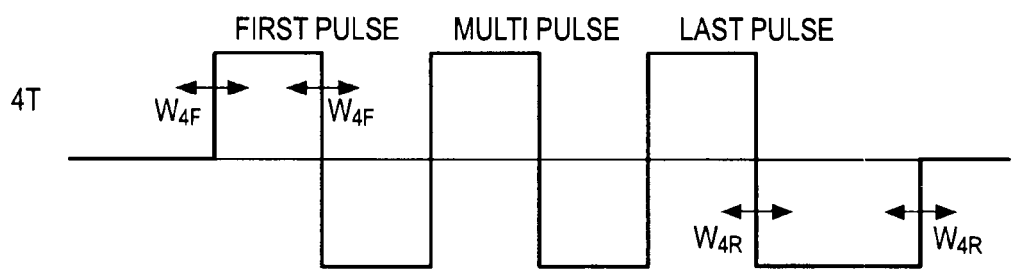

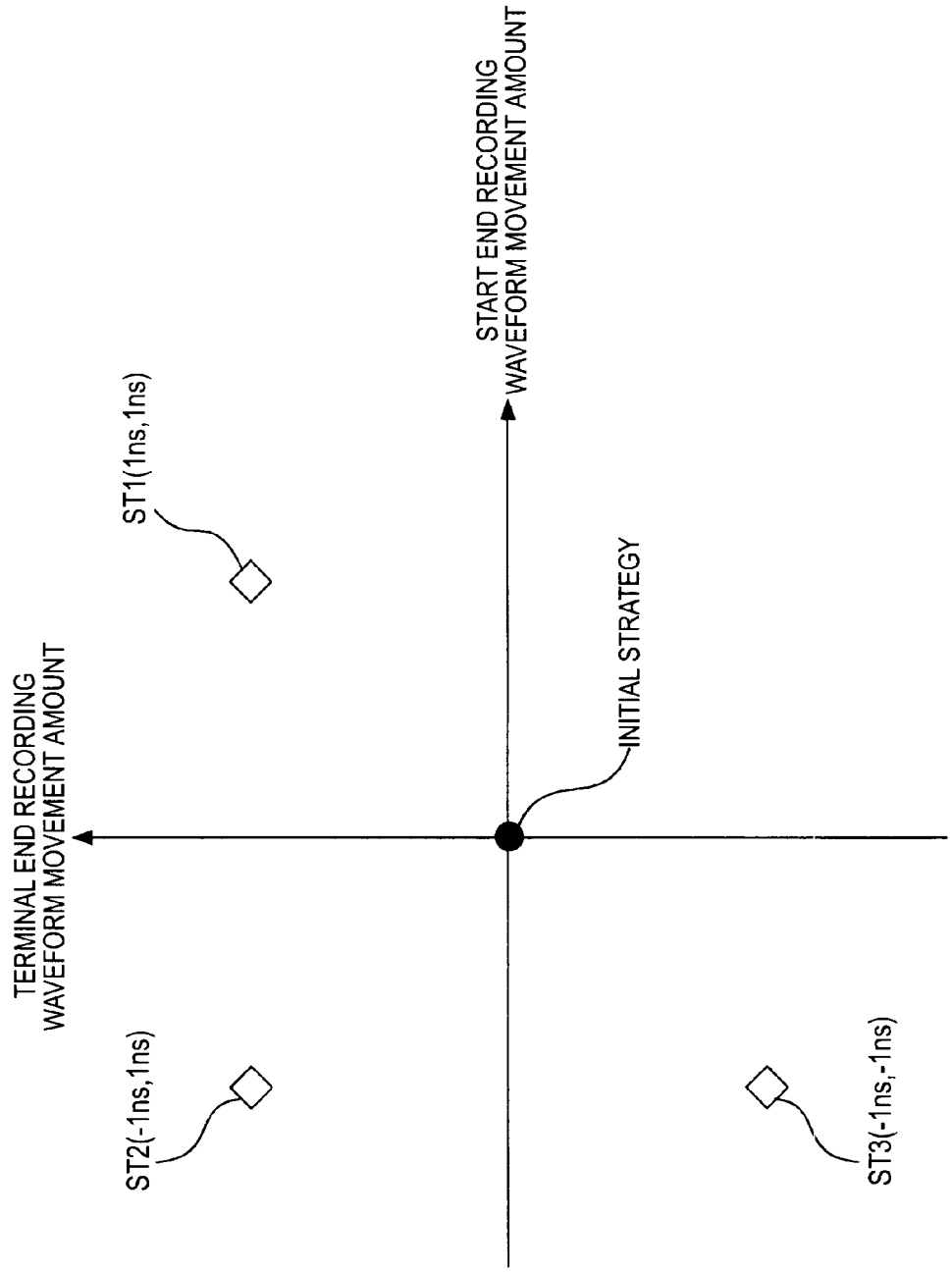

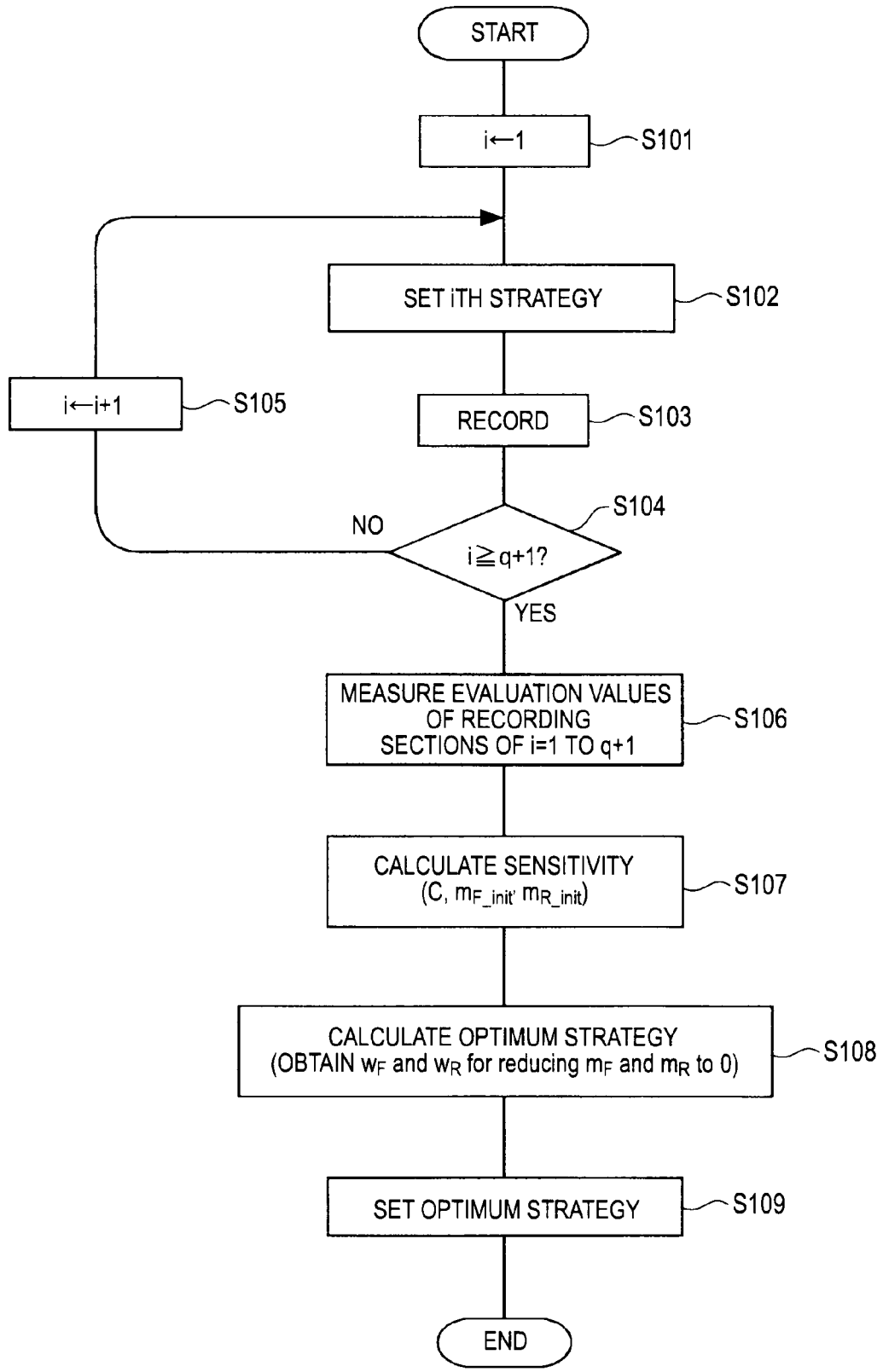

FIG.6

| CONDITIONS | | | STRATEGY SETTING | | | | | | | |
|---|---|---|---|---|---|---|---|---|---|---|
| | | | 2T | | 3T | | 4T | | 5T OR LARGER | |
| RECORDING FOR ADJUSTMENT | i | j | FRONT | REAR | FRONT | REAR | FRONT | REAR | FRONT | REAR |
| <1> | 1 | 1 | + | + | ○ | ○ | + | + | ○ | ○ |
| <2> | 2 | 1 | − | + | ○ | ○ | − | + | ○ | ○ |
| <3> | 3 | 1 | − | − | ○ | ○ | − | − | ○ | ○ |
| <4> | 1 | 2 | ○ | ○ | + | + | ○ | ○ | ○ | ○ |
| <5> | 2 | 2 | ○ | ○ | − | + | ○ | ○ | ○ | ○ |
| <6> | 3 | 2 | ○ | ○ | − | − | ○ | ○ | ○ | ○ |

DELAY: +
ADVANCE: −
ORIGINAL
CONDITION: ○

RECORDING AND REPRODUCING APPARATUS AND LASER DRIVING PULSE ADJUSTING METHOD

FIELD

The present disclosure relates to a recording and reproducing apparatus for an optical recording medium and a laser driving pulse adjusting method for the recording and reproducing apparatus.

BACKGROUND

For example, in a recording technique for an optical recording medium such as a DVD (Digital Versatile Disc) or a BD (Blu-ray Disc: registered trademark), as it is known as so-called write strategy, it is known that adjustment of a laser driving pulse for recording is performed.

In recent years, a technique for executing such write strategy adjustment for each of inserted disks is used.

For example, Japanese Patent No. 4274183 (Patent Document 1) proposes a technique for applying trial writing under q+1 conditions to the number (q) of edge types desired to be adjusted, learning the behavior of the edge types, and obtaining, on the basis of a result of the learning, through a calculation, an optimum edge shift amount for each of the edge types desired to be adjusted.

JP-A-2008-47181 (Patent Document 2) discloses, as a technique for measuring shift amounts of mark edge positions that should be used as evaluation values of the write strategy adjustment, a technique for making it possible to accurately measure shift amounts of edge positions concerning a short mark such as 2T (T represents channel bits) even when intersymbol interference occurs in a high-density optical disk such as a BD.

SUMMARY

In the write strategy adjusting method proposed in Patent Document 1, the write strategy adjustment is performed taking into account the influence of adjustment concerning a certain pulse edge position on other mark edge positions (referred to as mutual interference).

As the mutual interference, interference between a front edge and a rear edge is mainly predominant. Interference between different mark lengths is at a negligible level. Therefore, in Patent Document 1, when the trial writing is performed, edge positions of mark lengths to be subjected to adjustment are simultaneously changed. Specifically, when the mark lengths to be subjected to adjustment are represented as, for example, 2T, 3T, and 4T, pulse edge positions of all of these mark lengths 2T, 3T, and 4T are simultaneously changed to perform the trial writing. If the pulse edge positions of the mark lengths are simultaneously changed to perform the trial writing, a reduction in adjustment time is realized.

However, when the trial writing for simultaneously changing the edge positions of the mark lengths is performed, interference occurs in evaluation values concerning, in particular, short mark lengths such as a shortest mark length among evaluation values (shift amounts of mark edge positions) concerning signals trial-written by the trial writing. In other words, evaluation values of mark edge positions of the short mark lengths are affected by a change in the mark edge positions due to a change in pulse edge positions of the other mark lengths and values shifted from values that should be originally measured are measured.

Such interference of evaluation values concerning, in particular, the short mark lengths also occurs in evaluation values calculated by a method corresponding to a system in which the intersymbol interference described in Patent Document 2 occurs.

Since the evaluation values concerning the short mark lengths are likely to be measured as shifted values because of the interference of the evaluation values, in the method disclosed in Patent Document 1, it is likely that a shift also occurs in a result of the adjustment.

Therefore, it is desirable to provide a recording and reproducing apparatus configured as explained below.

A recording and reproducing apparatus according to an embodiment of the present disclosure includes an optical head unit that irradiates a laser beam on an optical recording medium and performs writing and readout of information represented by marks and spaces on the optical recording medium.

The recording and reproducing apparatus includes a laser-driving-pulse generating unit that generates a laser driving pulse corresponding to information to be recorded, supplies the laser driving pulse to the optical head unit, and causes the optical head unit to execute laser beam irradiation for recording.

The recording and reproducing apparatus includes an evaluation-value measuring unit that measures, on the basis of a signal read out from the optical recording medium by the optical head unit, an evaluation value representing an error of an edge position of the mark.

Further, the recording and reproducing apparatus includes a control and calculating unit that causes the recording and reproducing apparatus to separately execute, concerning plural mark lengths to be adjusted among mark lengths of the laser driving pulse, for each of sets of mark lengths grouped in advance, trial writing with shift amounts of edge positions of a laser driving pulse concerning the mark lengths belonging to the set changed, causes the recording and reproducing apparatus to execute readout of a signal recorded by the execution of the trial writing, causes the evaluation value measuring unit to measure an evaluation value under setting of the respective shift amounts, and obtains, on the basis of the measured evaluation values, an optimum edge shift amount of the laser driving pulse for each of the mark lengths to be adjusted.

If the trial writing for obtaining an optimum edge shift amount of each of the mark length to be adjusted is executed, concerning the mark lengths to be adjusted, separately for each of the sets of the mark lengths grouped in advance as explained above, the trial writing can be separately performed for each of the sets of the grouped mark lengths to reduce interference of evaluation values.

If the trial writing can be performed for each of the sets of the grouped mark lengths to reduce interference of evaluation values in this way, the optimum edge shift amount of each of the mark lengths to be adjusted can be more accurately obtained than the method in the past described in Patent Document 1 (the method in the past for performing the trial writing for simultaneously changing edge positions of mark lengths to be adjusted). Consequently, it is possible to realize write strategy adjustment more accurate than the method in the past.

As explained above, according to the embodiment of the present disclosure, it is possible to realize write strategy adjustment more accurate than the write strategy adjusting method in the past for performing the trial writing for simultaneously changing edge positions of mark lengths to be adjusted.

BRIEF DESCRIPTION OF THE DRAWINGS

FIG. 2 is a diagram for explaining laser driving pulses and recording edge positions of the laser driving pulses;

FIG. 3 is a diagram for explaining strategy setting in adjustment processing;

FIG. 4 is a flowchart for explaining strategy adjustment processing as a method in the past;

FIG. 6 is a diagram for explaining recording conditions for recordings for adjustment in the strategy adjusting method according to the embodiment;

DETAILED DESCRIPTION

Figure 1:
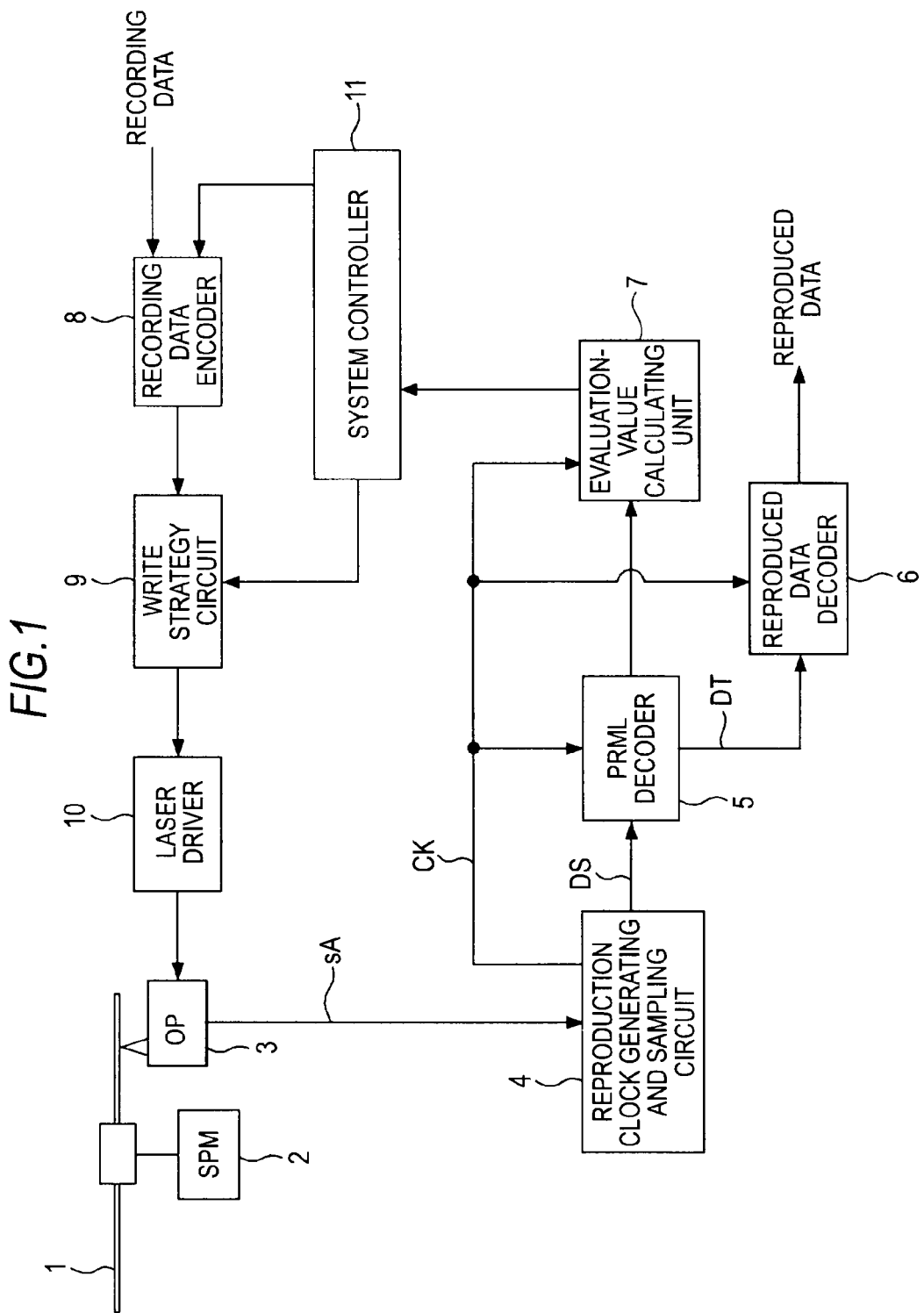
FIG. 1 is a block diagram of a main part of a recording and reproducing apparatus according to an embodiment.

An embodiment is explained below in the following order:
1. Configuration of a recording and reproducing apparatus
2. Strategy adjustment as a method in the past
2-1. Basic idea
2-2. Specific adjusting method
3. Strategy adjusting method according to an embodiment
4. Processing procedure
5. Method of deriving a combination in which interference of evaluation values is little
6. Modifications <1. Configuration of a Recording and Reproducing Apparatus>

FIG. 1 is a block diagram of a main part of a recording and reproducing apparatus according to the embodiment.

An optical disk 1 shown in the figure is a disk-like optical recording medium. Information is recorded in and reproduced from the optical disk 1 according to irradiation of a laser beam.

In the case of this example, it is assumed that the optical disk 1 is a high-density disk such as a BD (Blu-ray Disc: registered trademark).

The optical disk 1 is rotated by a spindle motor 2 during recording and reproduction.

An optical head (an optical pickup) 3 irradiates a laser beam, which is emitted from a laser diode, on the optical disk 1 from an object lens using a predetermined optical system. The optical head 3 leads reflected light from the optical disk 1 to a photodetector via a predetermined optical system and obtains an electric signal corresponding to a reflected light amount. Further, the optical head 3 applies arithmetic processing to light amount signals detected by plural photodetectors and generates a reproduction signal sA (a reproduction RF signal) for recorded information and various servo error signals of tracking, focus, and the like.

During recording, a laser driving pulse is supplied from a laser driver 10 to the optical head 3. The laser diode in the optical head 3 is driven to emit light according to the laser driving pulse.

During recording, recording data about to be recorded in the optical disk 1 is subjected to encode processing such as RLL(1,7) modulation by a recording data encoder 8 and an encode signal of the recording data is supplied to a write strategy circuit 9. The write strategy circuit 9 generates a laser driving pulse (a recording pulse) corresponding to the encode signal. A pulse level and pulse edge positions (hereinafter also referred to as recording edge positions) of the laser driving pulse generated by the write strategy circuit 9 are adjusted according to setting values received from the system controller 11.

The laser driving pulse generated by the write strategy circuit 9 and subjected to the strategy adjustment is changed to a driving signal for the laser diode in the optical head 3 via the laser driver 10.

During reproduction, the reproduction signal sA read out by the optical head 3 is supplied to a reproduction-clock generating and sampling circuit 4. The reproduction-clock generating and sampling circuit 4 generates a reproduction clock CK, which synchronizes with the reproduction signal sA, using a PLL (Phase Locked Loop) circuit, performs sampling of the reproduction signal sA, and outputs a sampling signal (a digital reproduction signal) DS. The reproduction clock CK is used in processing in a PRML (Partial Response Maximum Likelihood) decoder 5, a reproduced data decoder 6, and an evaluation-value calculating unit 7.

The sampling signal DS is supplied to the PRML decoder 5 and partial response equalization processing and Viterbi decoding processing are performed.

The PRML decoder 5 in this example includes an equalizer of a so-called adaptive equalization type as an equalizer for PR equalization such that the evaluation-value calculating unit 7 can calculate an evaluation value called dSAM.

As explained later as well, the evaluation-value calculating unit 7 calculates an evaluation value on the basis of a signal representing an equalization error (referred to as equalization error signal) obtained by the equalizer of the adaptive equalization type.

Decoded data (a binary data sequence) DT obtained by the decoding processing in the PRML decoder 5 is supplied to the reproduced data decoder 6, subjected to processing such as demodulation processing for RLL(1,7) modulation or the like, error correction processing, and deinterleave, whereby demodulated reproduced data is obtained.

The evaluation-value calculating unit 7 receives input of the equalization error signal obtained by the PRML decoder 5 and calculates an evaluation value, which is a difference between two difference metrics, using a value of the equalization error signal. The evaluation value is equivalent to the difference between the two difference metrics (SAM) and called "dSAM".

This evaluation value (dSAM) is the same as the evaluation value "dSAM" described in Patent Document 2. Specifically, the evaluation value as dSAM is a value quantitatively representing a bit shift direction and a shift amount and represents an error from an original position of a mark edge position.

Specifically, when a difference between a Euclidian distance between an equalization signal obtained by the PR equalizer and a most likely path and a Euclidian distance between the equalization signal and a counter path in terms of a bit advance direction is represented as first difference metric and a difference between a Euclidian distance between the equalization signal and the most likely path and a Euclidian distance between the equalization signal and the counter path in terms of the bit progress direction is represented as second difference metric, dSAM represents a difference between the first and second difference metrics.

As described in Patent Document 2, dSAM can be calculated on the basis of a value of the equalization error signal (see Formula 7 and FIG. 3 in Patent Document 2). The evaluation-value calculating unit 7 of this example also adopts a configuration for calculating dSAM on the basis of the equalization error signal.

As in the case of Patent Document 2, the evaluation-value calculating unit 7 of this example is configured to calculate, on the basis of a result obtained by performing pattern matching concerning the decoded data DT received from the PRML decoder 5, the evaluation value (dSAM) for each of front and rear edges, each of mark lengths, and each combination with immediately preceding space length or immediately following space length.

Specifically, the evaluation-value calculating unit 7 performs matching of the decoded data DT and a combination pattern of predetermined space length and predetermined mark length set in advance to calculate, concerning an edge position on a start end side of each of mark lengths, an evaluation value for each combination with immediately preceding space length of the edge position and calculate, concerning an edge position on a terminal end side, an evaluation value for each combination with immediately following space length of the edge position.

In the case of this example, as the evaluation value, it is sufficient that, at least for each of mark lengths, values concerning a start end side mark edge and a terminal end side mark edge of the mark length can be separately measured.

The evaluation value (dSAM) obtained by the evaluation-value calculating unit 7 is supplied to the system controller 11.

The system controller 11 is configured by a microcomputer including, for example, a CPU (Central Processing Unit) and memory devices such as a ROM (Read Only Memory) and a RAM (Random Access Memory).

The system controller 11 as a control unit of the recording and reproducing apparatus controls the units. In particular, in this example, the system controller 11 calculates, on the basis of the evaluation value acquired by the evaluation-value calculating unit 7, optimum strategy setting as explained later and executes processing for setting the optimum strategy setting in the write strategy circuit 9.

In the recording and reproducing apparatus shown in FIG. 1, although not shown in the figure, focus servo and tracking servo operations concerning the laser beam irradiated by the optical head 3, a transfer (sled movement) operation of the optical head 3, and the like are performed by a servo circuit and a servo driving mechanism (a two-axis mechanism, a sled mechanism, and the like in the optical head 3).

Rotation control for the spindle motor 2 is also performed by the servo circuit. The system controller 11 gives an instruction to the servo circuit, controls the driving of the spindle motor 2 and the behavior of the optical head 3 for a recording operation and a reproducing operation, and causes the spindle motor 2 and the optical head 3 to execute the recording operation and the reproducing operation for the optical disk 1.

<2. Strategy Adjustment as the Method in the Past>

Prior to explanation of a strategy adjusting method according to the embodiment, first, a method of strategy adjustment as the method in the past, which is the basis of the strategy adjusting method, is explained below.

The method of strategy adjustment as the method in the past explained in this section is the same as the method disclosed in Patent Document 1.

First, concerning write strategy adjustment, as an example of a simplest method of adjusting edge positions, there is an adjusting method for measuring evaluation values, which represent shift amounts of mark edge positions concerning individual edge positions, and adjusting the individual edge positions by degrees corresponding to the shift amounts.

For example, when a mark edge position on a terminal end side of certain mark length shifts in a plus direction by "1" from an original position, a terminal end side edge position of a recording pulse concerning the mark length is corrected by "−1".

However, as described in Patent Document 1 as well, in the write strategy adjustment, influence of adjustment of a certain recording edge position (an edge position of a recording pulse) on other mark edge positions (hereinafter referred to as mutual interference) should be taken into account.

As a result of occurrence of such mutual interference, when the simple adjusting method explained above is adopted, it is likely that long time is necessary for adjustment and it is difficult to property perform the adjustment itself. Specifically, in adjusting recording edge positions one by one while checking one mark edge position as in the adjusting method, not only the mark edge position to be checked shifts according to shift of the recording edge position to be adjusted. Actually, the other mark edge positions also shift. Therefore, in some case, a mark edge position concerning a recording edge position that should have been once optimally adjusted shifts because the other recording edge positions are adjusted. Therefore, not only long time is necessary but also adjustment accuracy tends to be deteriorated.

Therefore, the applicant proposed an adjusting method (the method in the past) explained below in Patent Document 1 to realize highly accurate write strategy adjustment taking into account the influence of mutual interference.

[2-1. Basic Idea]

A basic idea of strategy adjustment as the method in the past is explained below.

In the following explanation, it is assumed that mark lengths for which edge shift amounts are adjusted are three lengths 2T, 3T, and 4T. "T" represents channel bits.

First, in the strategy adjustment, a strategy is adjusted with reference to a strategy serving as a reference set in advance (referred to as initial strategy). The initial strategy is, for example, strategy recommendation information included in management information recorded in advance in the optical disk 1 or strategy setting information stored in the recording and reproducing apparatus. Depending on a recording and reproducing apparatus, an initial strategy corresponding to, for example, a manufacturer of the optical disk 1 or a disk type is stored.

In the strategy adjustment, recording for adjustment is performed in each of plural different strategy setting states with reference to the initial strategy.

In view of a specific configuration, the system controller 11 sets strategy setting selected with reference to the initial strategy in the write strategy circuit 9 and supplies random data to the recording data encoder 8 in the state of the strategy setting. The random data is subjected to modulation processing of an RLL(1,7) system or the like in the recording data encoder 8 and supplied to the write strategy circuit 9. The write strategy circuit 9 generates, on the basis of the write strategy setting at that point, a laser driving pulse corresponding to modulated data of the random data. The laser driving pulse is supplied to the laser driver 10 and drives the laser diode of the optical head 3, whereby trial recording (trial writing) for adjustment is applied to the optical disk 1.

The system controller 11 reproduces the recorded random data and acquires an evaluation value (representing an error of a mark edge position) calculated (measured) by the evaluation-value calculating unit 7 at that point.

The system controller 11 executes such processing in the plural strategy setting states and acquires evaluation values measured when data recorded in the respective strategy setting states are reproduced. The system controller 11 learns the behavior of the evaluation values in the respective strategy setting states, calculates optimum strategy setting for reducing the evaluation values to zero, and sets the optimum strategy setting in the write strategy circuit 9.

In the strategy adjustment as the method in the past, the calculation of an optimum strategy from measured evaluation values is performed on the basis of an idea explained below.

First, it is assumed that a relation between evaluation values and shift amounts of recording edge positions is linear.

It is assumed that there are q types of recording edge positions for which edge shift amounts are adjusted. The recording edge positions are represented by a vector w. For example, in FIG. 2, laser driving pulses respectively in the case of a 2T mark, a 3T mark, and a 4T mark are shown. In FIG. 2, a shift of a start end recording edge position, which is mainly a recording edge position of a first pulse, is represented as $w_F$ and a shift of a terminal end recording edge position, which is mainly a recording edge position of a last pulse, is represented by $w_R$. In particular, in this figure, the shifts are indicated as $w_{2F}$, $w_{2R}$, $w_{3F}$, $w_{3R}$, $w_{4F}$, and $w_{4R}$ according to the distinctions of 2T, 3T, and 4T.

In a "specific adjusting method" explained later, individually for the mark lengths of the 2T mark, the 3T mark, and the 4T mark, edges of the first pulse and the last pulse are set as recording edge positions that should be adjusted. In that case, recording edge positions to be adjusted are two types of $w_F$ and $w_R$. In other words, q is 2. In this case, recording edge positions to be calculated for adjustment concerning a laser driving pulse of the 2T mark are $w_F$ and $w_R$. Similarly, recording edge positions to be calculated for adjustment concerning the 3T mark and the 4T mark are $w_F$ and $w_R$.

Recording edge positions that should be adjusted only have to be appropriately determined according to a specific method. First, as an idea, as explained above, it is assumed that there are q types of recording edge positions that should be calculated for adjustment. The recording edge positions are represented by the vector w.

On the other hand, it is assumed that there are p types of mark edge position errors. The mark edge position errors are represented by a vector m. A mark edge position error in the initial strategy is represented by $m_{init}$.

In this case, a matrix C of p×q shown in the following Formula (1) represents the behavior of evaluation values concerning the p types of mark edge positions with respect to shift amounts of the q types of recording edge positions. The behavior is also referred to as "interference sensitivity" below.

$$m = Cw + m_{init} \quad (1)$$

As indicated by Formula (1), it is assumed that a relation between the shift amounts of the recording edge positions and mark edge position errors (evaluation values) is linear.

A relation between p and q is selected as $p \geq q$. Trial recording for adjustment is performed in q+1 ways of strategy setting states and mark edge position errors are acquired, whereby the matrix C and the vector $m_{init}$ can be obtained. For example, as a calculation method, there is a method of obtaining an optimum recording edge shift amount $w_0$ by performing calculation of the following Formula (2) from obtained matrix and vector.

$$w_0 = C^\# m_{init} \quad (2)$$

In this case, $C^\#$ is a pseudo inverse matrix in the case of p>q and is an inverse matrix in the case of p=q.

The trial recordings in q+1 ways are necessary because a minimum number of trial recordings necessary for obtaining the matrix C and the vector $m_{init}$ of Formula (1) is q+1 ways.

A shift amount wtest of edge positions in the trial recordings in q+1 ways only has to be selected such that q types of vectors with w0 set as a reference are linearly independent vectors with respect to one recording edge shift amount w0 selected as appropriate. In other words, the appropriate recording edge shift amount w0 is selected and vectors w1+w0, w2=w0, . . . , and wq+1=w0 are selected to be linearly independent.

For example, in the case of p=2 and q=2, 4w0 only has to be selected as $[0\ 0]^T$ and linearly independent vectors $[1\ 0]^T$ and $[0\ 1]^T$ only have to be selected.

Evaluation values and recording edge positions used in the "specific adjusting method" explained later are explained.

A mark edge position including a combination of immediately preceding space length and immediately following mark length is referred to as start end mark edge position. A mark edge position including a combination of immediately preceding mark length and immediately following space length is referred to as terminal end mark edge position.

In the specific adjusting method explained later, mark lengths and space lengths are classified by a method of classifying the lengths into 2T, 3T, 4T, and 5T or larger.

Evaluation values are defined below.

In the specific adjusting method explained later, as the evaluation values, concerning the mark lengths 2T, 3T, and 4T, evaluation values on the start end mark edge position side and evaluation values on the terminal end mark edge position side of the mark lengths are respectively measured.

In the following explanation, the evaluation values on the start end mark edge position side are represented as "start end mark edge position error $m_F$".

Similarly, the evaluation values on the terminal end mark edge position side are represented as "terminal end mark edge position error $m_R$".

In the strategy adjustment in this case, the recording edge positions are adjusted to reduce these mark edge position errors to zero.

Subsequently, in the strategy adjustment, the recording edge positions are moved to move the mark edge positions.

For example, if a section where the start end mark edge position is adjusted is referred to as start end recording edge position and a section where the terminal end mark edge position is adjusted is referred to as terminal end recording edge position, the edge position shifts ($w_{2F}$, $w_{2R}$, $w_{3F}$, $w_{3R}$, $w_{4F}$, and $w_{4R}$) shown in FIG. 2 only have to be performed concerning the recording edge positions that should be adjusted.

[2-2. Specific Adjusting Method]

On the basis of the premise explained above, a specific strategy adjusting method as the method in the past is explained below.

The strategy adjusting method as the method in the past explained below is a method adapted to a case in which it is considered that, without taking into account mark length and space length before and after an edge, interference of marks and spaces of other Ts is little. The strategy adjusting method is suitable when a reduction in adjustment time is requested.

To put is briefly, the strategy adjusting method is an adjusting method that mainly takes into account that, if a certain recording edge position is moved, in addition to the edge position on the moved side, an edge position on the other end side also moves in association with the movement of the edge position on the moved side.

As explained above, the mark lengths are classified as 2T, 3T, and 4T. In other words, start end recording edge positions and terminal end recording edge positions are respectively obtained concerning the 2T mark, the 3T mark, and the 4T mark.

A start end and a terminal end of a mark edge position error at the time at the time when recording edge positions are moved without distinguishing the mark lengths are respectively represented as $m_F$ and $m_R$.

Similarly, shift amounts of the recording edge positions are distinguished into a start end and a terminal end and respectively represented as $w_F$ and $w_R$ without distinguishing the mark lengths. For confirmation, the shift amount $w_F$ on the start end side and the shift amount $w_R$ on the terminal end side respectively represent shift amounts from the start end recording edge position and the terminal end recording edge position set as the initial strategy.

A start end and a terminal end of a mark edge position error recorded in the initial strategy are respectively represented as $m_{F\_init}$ and $M_{R\_init}$.

The mark edge position errors $m_F$ and $m_R$ with respect to the shift amounts $w_F$ and $w_R$ of the recording edge positions are represented as indicated by the following Formula (3) according to the idea indicated by Formula (1).

$$\begin{bmatrix} m_F \\ m_R \end{bmatrix} = \begin{bmatrix} C_{11} & C_{12} \\ C_{21} & C_{22} \end{bmatrix} \begin{bmatrix} w_F \\ w_R \end{bmatrix} + \begin{bmatrix} m_{F\_init} \\ m_{R\_init} \end{bmatrix} \quad (3)$$

In this case, in order to obtain q=2 types of recording edge positions as the shift amount $w_F$ of the start end recording edge position and the shift amount $w_R$ of the terminal end recording edge position, trial recording for adjustment is performed in q+1=3 ways of strategy settings. The start end recording edge position shift amount $w_F$ and the terminal end recording edge position shift amount $w_R$ with which the start end mark edge position error $m_F$ and the terminal end mark edge position error $m_R$ obtained when recorded data is reproduced are made 0 only have to be obtained.

Assuming that a relation between the two kinds of recording edge position shift amounts $w_F$ and $w_R$ and the two or more kinds of mark edge position errors $m_F$ and $m_R$ is linear, trial recording is performed in three ways of strategy settings. At this point, an optimum strategy can be obtained from Formula (2) by obtaining the matrix C ($C_{11}$, $C_{12}$, $C_{21}$, $C_{22}$) and the vector $m_{init}$ ($m_{F\_init}$, $m_{R\_init}$).

In the strategy adjusting method in the past, the trial recording for adjustment is performed as explained below.

First, in the trial recording, three ways of strategy settings ST1, ST2, and ST3 shown in FIG. 3 are set in advance.

When a recording waveform movement amount (an edge shift amount) is represented as (start end recording waveform movement amount, terminal end recording waveform movement amount) with the initial strategy set as the origin, the strategy settings ST1, ST2, and ST3 are three points (1 [ns], 1 [ns]), (−1 [ns], 1 [ns]), and (−1 [ns], −1[ns]). [ns] is an abbreviation of nanosec (nanosecond).

The recording edge positions are respectively changed according to the three strategy settings ST1, ST2, and ST3 to perform the trial recording.

Random data is used for the trial recording. The recording edge position shift amounts $w_F$ and $w_R$ of relevant mark lengths (in this case, 2T, 3T, and 4T) in the random data are respectively changed to the strategy settings ST1, ST2, and ST3 to perform three kinds of trial recordings in total for the respective strategy settings.

Mark edge position errors (evaluation values) concerning signals subjected to the trial recording under the respective strategy settings ST1, ST2, and ST3 in this way are measured, whereby the matrix C and the vector $m_{init}$ of Formula (3) are obtained. A recording edge position movement amount of a laser driving pulse that should be adjusted is calculated from the calculation of Formula (2).

A specific processing procedure of the strategy adjusting method as the method in the past is explained with reference to a flowchart of FIG. 4.

In the explanation, it is assumed that the processing shown in FIG. 4 is executed by the system controller 11 shown in FIG. 1.

First, in step S101, the system controller 11 sets a variable i to 1. In step S102, the system controller 11 controls the write strategy circuit 9 to ith strategy setting (STi). For example, the system controller 11 controls the write strategy circuit 9 to a state of the strategy setting ST1, i.e., sets the start end recording waveform movement amount to 1 [ns] and sets the terminal end recording waveform movement amount to 1 [ns].

The system controller 11 causes the recording and reproducing apparatus to execute recording in step S103 in this state. The system controller 11 causes the recording and reproducing apparatus to generate random data as data for the trial recording for adjustment and gives the random data to the recording data encoder 8. The random data is modulated by the recording data encoder 8. The write strategy circuit 9 forms a waveform as a laser driving pulse according to the modulated data. At this point, a laser driving pulse is generated with the start end recording edge position shift amount $w_F$ set to 1 [ns] and the terminal end recording edge position shift amount $w_R$ set to 1 [ns] according to the strategy setting ST1. The laser driving pulse is supplied to the laser driver 10, the laser diode in the optical head 3 is driven to emit light, and recording is performed.

Subsequently, in step S104, the system controller 11 checks the variable i. If the variable i is not i≧q+1 (i.e., in this case, i≧3), in step S105, the system controller 11 increments the variable i and executes the processing in steps S102 and S103 in the same manner.

Specifically, the system controller 11 causes the recording and reproducing apparatus to generate a laser driving pulse in the second strategy setting ST2 for setting the start end recording edge position shift amount $w_F$ to −1 [ns] and setting the terminal end recording edge position shift amount $w_R$ to 1 [ns] and causes the recording and reproducing apparatus to execute recording of the random data.

The system controller 11 proceeds from step S104 to step S105, increments the variable i, and executes the processing in steps S102 and S103 in the same manner.

Specifically, the system controller 11 causes the recording and reproducing apparatus to generate a laser driving pulse in the third strategy setting ST3 for setting the start end recording edge position shift amount $w_F$ to −1 [ns] and setting the terminal end recording edge position shift amount $w_R$ to −1 [ns] and causes the recording and reproducing apparatus to execute recording of the random data.

When an affirmative result indicating that the variable is i≧q+1 (i.e., i≧3) is obtained in step S104, the system controller 11 proceeds to step S106 and executes evaluation value measurement processing for recording sections of i=1 to q+1. Specifically, the system controller 11 controls the optical head 3 and reproducing system units to execute a reproducing operation concerning sections recorded by loop processing of steps S102 to S105. At this point, the system controller 11 causes the evaluation-value calculating unit 7 to measure (calculate) an evaluation value as dSAM (a mark edge position error Mepe). Specifically, the system controller 11 causes the evaluation-value calculating unit 7 to measure, concerning each of the 2T mark, the 3T mark, and the 4T mark, the start end mark edge position error $m_F$ and the terminal end mark edge position error $m_R$ under the strategy settings ST1 to ST3.

After causing the evaluation-value calculating unit 7 to measure, concerning each of the 2T mark, the 3T mark, and the 4T mark, the start end mark edge position error $m_F$ and the terminal end mark edge position error $m_R$ under the strategy settings ST1 to ST3 in step S106, the system controller 11 advances the processing to step S107.

In step S107, the system controller 11 performs sensitivity calculation using the start end recording edge position shift amount $w_F$ and the terminal end recording edge position shift amount $w_R$ in the respective strategy settings and the measured start end mark edge position error $m_F$ and terminal end mark edge position error $m_R$.

This is processing for obtaining, concerning each of the 2T mark, the 3T mark, and the 4T mark, the matrix C ($C_{11}$, $C_{12}$, $C_{21}$, $C_{22}$) and the vector $m_{init}$ ($M_{F\_init}$, $M_{R\_init}$) in Formula (3). Specifically, the system controller 11 substitutes, for each of the mark lengths, the start end recording edge position shift amount $w_F$ and the terminal end recording edge position shift amount $w_R$ as the first to third strategy settings and the start end mark edge position error $m_F$ and the terminal end mark edge position error $m_R$ measured in those setting sections in Formula (3) and solves three simultaneous equations obtained by the substitution to obtain the matrix C ($C_{11}$, $C_{12}$, $C_{21}$, $C_{22}$) and the vector $m_{init}$ ($m_{F\_init}$, $M_{R\_init}$).

After obtaining the matrix C ($C_{11}$, $C_{12}$, $C_{21}$, $C_{22}$) and the vector $m_{init}$ ($M_{F\_init}$, $M_{R\_init}$), in step S108, the system controller 11 calculates Formula (2) to calculate an optimum strategy for each of the mark lengths. Specifically, the system controller 11 obtains the start end recording edge position shift amount $w_F$ and the terminal end recording edge position shift amount $w_R$ for respectively reducing the start end mark edge position error $m_F$ and the terminal end mark edge position error $m_R$ to zero.

For confirmation, Formula (2) is derived from "$0=Cw+m_{init}$" obtained by setting m to 0 in Formula (1).

Specifically, in step S108, first, the system controller calculates an inverse matrix $C^{\#}$ of the matrix C (the interference sensitivity C) obtained in step S107 and solves Formula (2) using the inverse matrix $C^{\#}$ and the vector $m_{init}$ ($M_{F\_init}$, $M_{R\_init}$) to obtain the start end recording edge position shift amount $w_F$ and the terminal end recording edge position shift amount $w_R$ for reducing the start end mark edge position error $m_F$ and the terminal end mark edge position error $m_R$ to zero.

The start end recording edge position shift amount $w_F$ and the terminal end recording edge position shift amount $w_R$ calculated in this way are correction amounts for the initial strategy. Therefore, strategy setting obtained by correcting, concerning the initial strategy, the start end recording edge position shift amount $w_F$ and the terminal end recording edge shift amount $w_R$ can also be set as an optimum strategy.

In the next step S109, the system controller 11 sets the calculated optimum strategy for each of the mark lengths in the write strategy circuit 9.

The strategy adjustment processing by the method in the past is completed.

Appropriate adjustment of a write strategy that takes into account "mutual interference", which is influence of adjustment of a certain recording edge position on other mark edge positions, can be realized by the strategy adjusting method as the method in the past.

In the method in the past, as the trial recording, the trial writing for simultaneously changing the strategy settings ST of the mark lengths (2T, 3T, and 4T) to be adjusted is performed. Therefore, it is possible to suppress the number of times of trial writing to three times in total corresponding to the strategy settings ST1 to ST3. Consequently, a reduction in adjustment time is realized.

<3. Strategy Adjusting Method According to an Embodiment>

As it is understood from the above explanation, in realizing strategy adjustment that takes into account mutual interference, rather than performing trial writing and evaluation value measurement independently for each one of recording edge positions to be adjusted, the trial recording for simultaneously changing plural recording edge positions only has to be performed to obtain an optimum strategy on the basis of evaluation values measured as a result of the trial recording.

In the method in the past explained as an example above, as the trial writing for simultaneously changing the plural recording edge positions in this way, taking into account a reduction in adjustment time, the trial recording for simultaneously changing start end recording edge positions and terminal end recording edge positions is performed concerning all the mark lengths (2T, 3T, and 4T) to be adjusted.

However, if the trial writing for simultaneously changing the recording edge positions of all the mark lengths to be adjusted is performed in this way, interference occurs in evaluation values concerning, in particular, short mark lengths such as shortest mark length among evaluation values measured concerning a trial-written signal.

In other words, evaluation values concerning mark edge positions of the short mark lengths are affected by a change in the mark edge positions due to the change of the recording edge positions concerning the other mark lengths and measured as values shifted from values that should originally be measured.

Such interference of evaluation values is conspicuous, in particular, in a high density disk such as a BD.

Specifically, such interference of evaluation values is considered to occur because the size of a beam spot of a laser beam is large relatively to a mark formed on the optical disk 1. In particular, in the case of short mark length, a shift of an edge concerning a mark adjacent to the mark length is observed in a spot (i.e., detected as the reproduction signal sA). As a result, in particular, in an evaluation value concerning the short mark length, an error from a value that should be originally measured occurs.

In this embodiment, as evaluation values corresponding to a case in which intersymbol interference occurs, dSAM same as that described in Patent Document 2 is used. However, as it is understood from the principle of occurrence of interference, interference of evaluation values also occurs when such evaluation values as dSAM are used.

In the method in the past for performing trial writing for simultaneously moving the edge positions concerning all the mark lengths to be adjusted, in particular, concerning short mark length, it is difficult to obtain a proper evaluation value. As a result, it is likely that an optimum strategy may be unable to be accurately obtained. In other words, the accuracy of strategy adjustment tends to fall.

Therefore, in an embodiment, to suppress the influence due to such interference of evaluation values and realize more highly accurate strategy adjustment, a strategy adjusting method explained below is proposed.

Figure 5A:
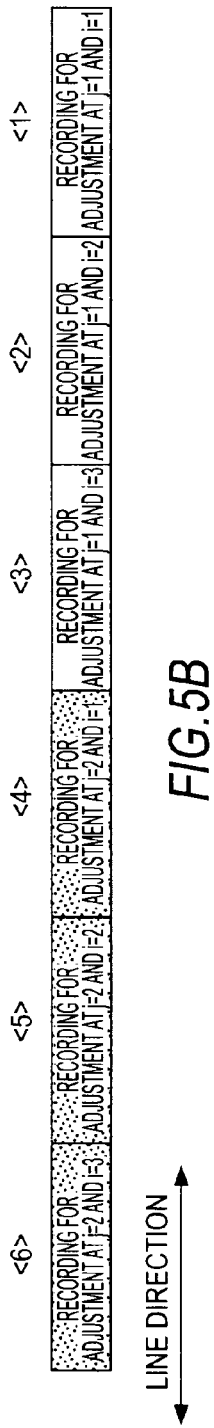
FIGS. 5A and 5B are diagrams for explaining a strategy adjusting method according to an embodiment.
Figure 5B:
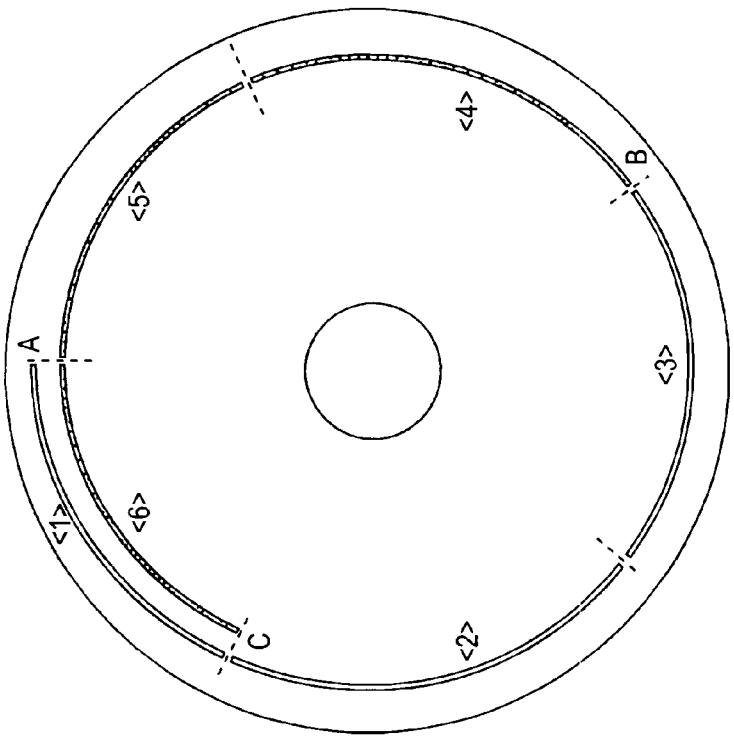

FIGS. 5A and 5B are diagrams for explaining the strategy adjusting method according to this embodiment. FIG. 5B is a schematic diagram of sections where trial writing for adjustment (recording for adjustment) is applied to the optical disk 1. FIG. 5A is a diagram in which the sections where the recording for adjustment is performed shown in FIG. 5B are arranged in a line direction of the optical disk 1.

FIG. 6 is a diagram for explaining recording conditions for the recording for adjustment in the strategy adjusting method according to this embodiment.

First, in this embodiment, it is also assumed that mark lengths to be adjusted are 2T, 3T, and 4T. In other words, in this embodiment, an optimum strategy concerning a start end recording edge position and a terminal end recording edge position of each of the mark length 2T, 3T, and 4T is obtained.

In this embodiment, unlike the method in the past, the trial writing for adjustment is not performed by simultaneously changing recording edge positions of all mark lengths to be adjusted. The trial writing for adjustment is performed separately for each of sets of mark lengths, which form a "combination in which interference of evaluation values is little", obtained in advance.

Specifically, in the case of this example, as the "combination in which interference of evaluation values is little", a "combination in which interference of evaluation values is the least" is obtained by a deriving method explained later. It is assumed that, as a result, a combination of a set of "2T, 4T" and a set of "3T alone" is determined.

As such a combination in which interference of evaluation values is little, a different combination could be derived according to a difference in conditions for recording and reproduction adopted by a system (e.g., recording and reproduction wavelength, a numerical aperture of an object lens, and a material of a recording film of the optical disk 1).

An example of a specific deriving method for obtaining such a combination in which interference of evaluation values is little is explained later.

As explained above, in this embodiment, the trial writing for adjustment is performed by dividing the "combination in which interference of evaluation values is the least" into the set of "2T, 4T" and the set of "3T alone".

As it is understood with reference to FIGS. 5A and 5B and FIG. 6, in this case, as the trial writing, trial writing concerning the set of "2T, 4T" is executed first, and thereafter, trial writing concerning the set of "3T alone" is executed.

In FIGS. 5A and 5B and FIG. 6, a variable i is the same as the variable i explained with reference to FIG. 4 and represents a distinction of the strategy settings ST.

A variable j is a variable representing a distinction of a set of mark lengths. In this case, j=1 represents the set of "2T, 4T" and j=2 represents the set of "3T alone".

More specifically, as the trial writing in this case, first, as recording for adjustment <1>, trial writing according to a setting state as the strategy setting ST1 (the start end recording edge position shift amount $w_F$=1 [ns] and the terminal end recording edge position shift amount $w_R$=1 [ns]) explained above is applied to the set of "2T, 4T".

Subsequently, as recording for adjustment <2> and recording for adjustment <3>, similarly, trial writing according to the strategy setting ST2 (the start end recording edge position shift amount $w_F$=−1 [ns] and the terminal end recording edge position shift amount $w_R$=1 [ns]) and trial writing according to the strategy setting ST3 (the start end recording edge position shift amount $w_F$=−1 [ns] and the terminal end recording edge position shift amount $w_R$=−1 [ns]) are respectively applied to the set of "2T, 4T".

Further, as trial writing at j=2, trial writing concerning the set of "3T alone" is performed separately from the recordings for adjustment <1> to <3> (i.e., the trial writing at j=1) concerning the set of "2T, 4T".

First, as recording for adjustment <4>, trial writing according to the strategy setting ST1 is applied to the set of "3T alone". Subsequently, as recording for adjustment <5> and recording for adjustment <6>, similarly, the trial writing according to the strategy setting ST2 and the trial writing according to the strategy setting ST3 are respectively applied to the set of "3T alone".

In the strategy adjustment, calculation (measurement) of evaluation values by the evaluation-value calculating unit 7 is performed targeting sections where the recordings for adjustment <1> to <3> and the recordings for adjustment <4> to <6> are respectively performed.

In the case of this embodiment, measurements of evaluation values concerning the recordings for adjustment <1> to <3> and the recordings for adjustment <4> to <6> are separately performed every time each of the recordings is completed. Specifically, immediately after the recordings for adjustment <1> to <3> are performed, the measurement of evaluation values concerning the recordings for adjustment <1> to <3> is performed. After the measurement of evaluation values concerning the recordings for adjustment <1> to <3>, the recordings for adjustment <4> to <6> are performed. Immediately after the recordings for adjustment <4> to <6>, the measurement of evaluation values concerning the recordings for adjustment <4> to <6> is performed.

For confirmation, in the measurement of evaluation values concerning the recorded sections at j=1 as the recordings for adjustment <1> to <3>, the start end mark edge position error $m_F$ and the terminal end mark edge position error $m_R$ concerning the 2T mark and the 4T mark are respectively measured.

Concerning the recorded sections at j=2 as the recordings for adjustment <4> to <6>, only the start end mark edge position error $m_F$ and the terminal end mark edge position error $m_R$ concerning the 3T mark are measured.

In this example, as shown in FIGS. 5A and 5B, the recordings for adjustment <1> to <3> are performed in order from the outer circumference side to the inner circumference side and the recordings for adjustment <4> to <6> are performed in order from the inner circumference side to the outer circumference side in the same manner from an area adjacent to the inner circumference side of the recording for adjustment <3>. This is because, according to the standards of a BD, it is provided that a trial writing area is used from the outer circumference side. Therefore, if standards are different, this provision does not apply.

By performing the measurement of evaluation values as explained above, the start end mark edge position error $m_F$ and the terminal end mark edge position error $m_R$ concerning the mark lengths 2T to 4T are respectively measured.

After the start end mark edge position error $m_F$ and the terminal end mark edge position error $m_R$ concerning the mark lengths 2T to 4T to be measured are respectively measured, in the same manner as the strategy adjusting method as the method in the past explained above, for each of the mark lengths 2T to 4T, the matrix C ($C_{11}$, $C_{12}$, $C_{21}$, $C_{22}$) and the vector $M_{init}$ ($m_{F\_init}$, $m_{R\_init}$) are obtained, the inverse matrix $C^{\#}$ concerning the obtained matrix C is calculated, and Formula (2) is solved using the inverse matrix $C^{\#}$ and the vector $m_{init}$ ($M_{F\_init}$, $M_{R\_init}$) to obtain the start end recording edge position shift amount $w_F$ and the terminal end recording edge position shift amount $w_R$ for respectively reducing the start end mark edge position error $m_F$ and the terminal end mark edge position error $m_R$ to zero.

The start end recording edge position shift amount $w_F$ and the terminal end recording edge position shift amount $w_R$ calculated for each of the mark lengths in this way are set as an optimum strategy, which is a correction amount with respect to the initial strategy.

In this case, as in the case explained above, the system controller 11 sets the optimum strategy obtained for each of the mark lengths in this way in the write strategy circuit 9.

In the strategy adjusting method according to this embodiment, the trial writing for adjustment is performed separately for each of sets of grouped mark lengths to reduce interference of evaluation values.

Consequently, compared with the method in the past for simultaneously changing recording edge positions of all mark lengths to be adjusted, it is possible to effectively suppress interference of evaluation values considered to occur concerning a short mark. As a result, it is possible to realize write strategy adjustment more accurate than the method in the past.

The strategy adjusting method according to this embodiment is not a method of independently adjusting each one of recording edge positions to be adjusted but is a method of simultaneously changing plural recording edge positions. Therefore, in this regard, a reduction in the length of adjustment processing is realized.

Compared with adjustment processing independently performed for each of mark lengths to be adjusted, it is possible to realize a reduction in adjustment time.

<4. Processing Procedure>

Figure 7:
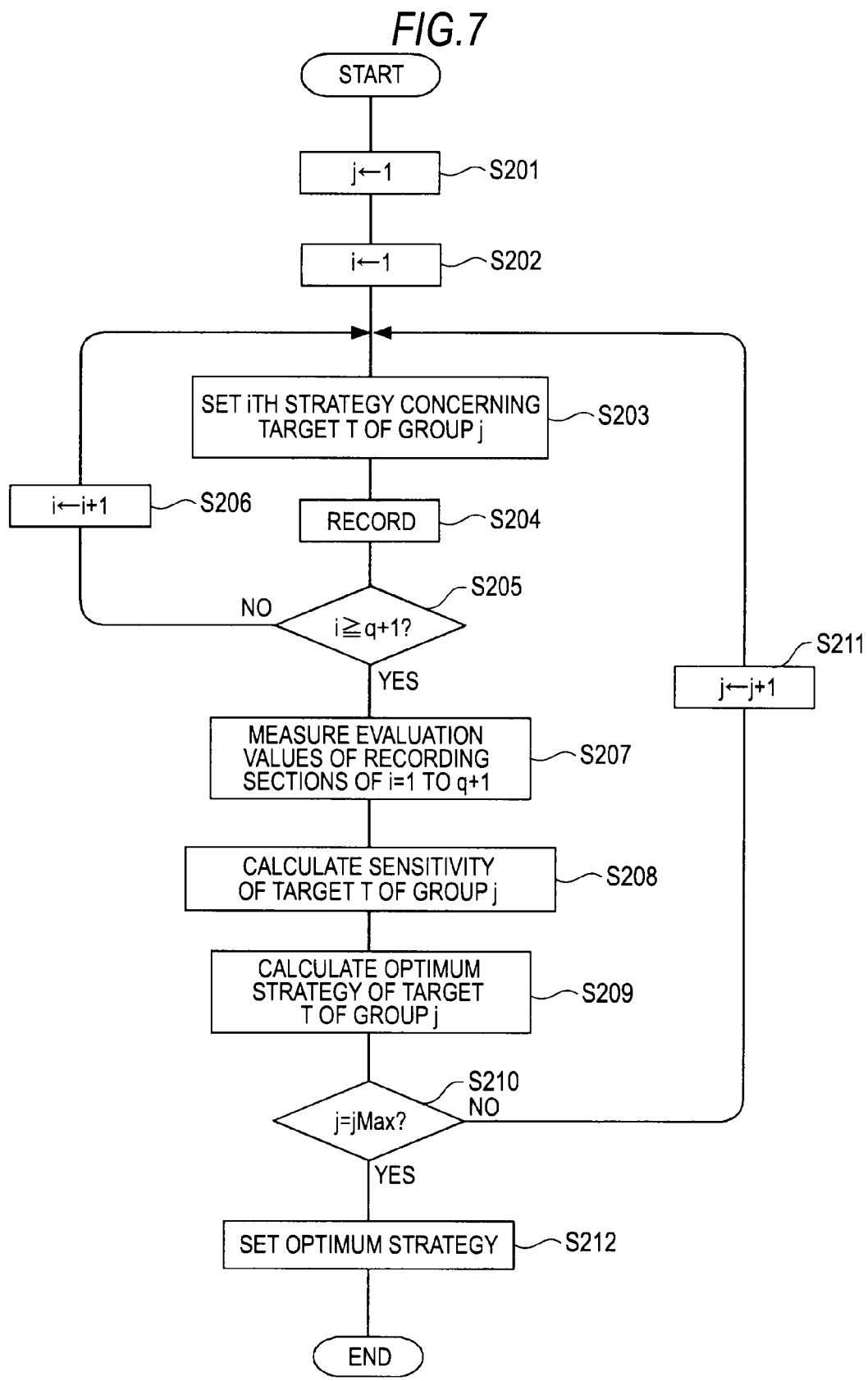
FIG. 7 is a flowchart for explaining a procedure of specific processing for realizing the strategy adjusting method according to the embodiment.

FIG. 7 is a flowchart for explaining a procedure of specific processing for realizing the strategy adjusting method according to the embodiment explained above.

The system controller 11 shown in FIG. 1 executes the processing shown in FIG. 7 on the basis of a computer program stored, for example, in a ROM or the like included in the system controller 11.

First, in step S201, the system controller 11 sets the variable j to 1.

In the subsequent step S202, the system controller 11 sets the variable i to 1 as in step S101 shown in FIG. 4.

In the next step S203, the system controller 11 controls the write strategy circuit 9 such that the ith strategy setting (STi) is performed concerning a target T of a group j. Specifically, if j is 1, the system controller 11 controls the write strategy circuit 9 such that the strategy settings ST concerning the marks of "2T, 4T" are set to STi. If j is 2, the system controller 11 controls the write strategy circuit 9 such that the strategy setting ST concerning the 3T mark is set to STi.

After executing the strategy setting processing in step S203, in step S204, the system controller 11 causes the recording and reproducing apparatus to execute recording. In this case, as in the case explained above, the system controller 11 causes the recording and reproducing apparatus to generate random data as data for trial writing for adjustment and gives the random data to the recording data encoder 8.

The random data is modulated by the recording data encoder 8. A wave form as a laser driving pulse is formed in the write strategy circuit 9 according to the modulated data. At this point, a laser driving pulse according to the start end recording edge position shift amount $w_F$ and the terminal end recording edge position shift amount $w_R$ conforming to the strategy setting STi is generated. Consequently, trial writing according to the strategy setting STi is executed.

In the following step S205, the system controller 11 checks the variable i in the same manner as the preceding step S104. If i is not i≧q+1 (i.e., in this case, as in the case explained above, i≧3), in step S206, the system controller 11 increments the variable i and returns to step S203. Consequently, trial writings with the strategy settings ST1 to ST3 respectively set are executed concerning the target T of the group j.

On the other hand, when an affirmative result indicating that the variable i is i≧q+1 (i.e., i≧3) is obtained in step S205, the system controller 11 proceeds to step S207 and executes evaluation value measurement processing for recording sections of i=1 to q+1. Specifically, if the trial writings as the recordings for adjustment <1> to <3> are executed at j=1, the system controller 11 causes the recording and reproducing apparatus to execute a reproducing operation concerning trial-written sections by the recordings for adjustment <1> to <3> and causes the evaluation-value calculating unit 7 to measure the start end mark edge position error $m_F$ and the terminal end mark edge position error $m_R$ under the respective strategy settings ST1 to ST3 of the 2T mark and the 4T mark.

If the trial writings as the recordings for adjustment <4> to <6> are executed at j=2, the system controller 11 causes the recording and reproducing apparatus to execute a reproducing operation concerning trial-written sections by the recordings for adjustment <4> to <6> and causes the evaluation-value calculating unit 7 to measure the start end mark edge position error $m_F$ and the terminal end mark edge position error $m_R$ under the respective strategy settings ST1 to ST3 concerning the 3T mark.

After executing the evaluation value measurement processing in step S207, in step S208, the system controller 11 performs sensitivity calculation concerning the target T of the group j.

Specifically, if j is 1, concerning the marks 2T and 4T, the system controller 11 performs the sensitivity calculation using the start end recording edge position shift amount $w_F$ and the terminal end recording edge position shift amount $w_R$ in the respective strategy settings ST1 to ST3 and the measured start end mark edge position error $m_F$ and terminal end mark edge position error $m_R$.

Alternatively, if j is 2, concerning the 3T mark, the system controller 11 performs the sensitivity calculation using the start end recording edge position shift amount $w_F$ and the terminal end recording edge position shift amount $w_R$ in the respective strategy settings ST1 to ST3 and the measured start end mark edge position error $m_F$ and terminal end mark edge position error $m_R$.

In the subsequent step S209, the system controller 11 calculates an optimum strategy of the target T of the group j.

A specific method of the sensitivity calculation (the calculation of the matrix C and the vector $m_{F\_init}$, $m_{R\_init}$) concerning the target T in step S208 and a specific method of the calculation of an optimum strategy in step S209 based on a sensitivity calculation result are the same as those in the case of the strategy adjusting method as the method in the past explained above.

After calculating the optimum strategy concerning the target T in step S209, in step S210, the system controller 11 discriminates whether j is jMAX. jMAX means a maximum of j, which is an upper limit of the number of sets of mark lengths (in the case of this example, "2"). In other words, in the case of this example, in step S209, the system controller 11 discriminates whether j is 2.

When a negative result indicating that j is not jMAX (in the case of this example, j is 1) is obtained in step S209, after incrementing the value of the variable j in step S211, the system controller 11 returns to step S203. Consequently, the processing from the trial writing to the calculation of an optimum strategy is executed concerning a new group j (i.e., when j is 1, concerning a group of j=2).

On the other hand, when an affirmative result indicating that j is jMAX (in this example, j is 2) is obtained in step S209, in step S212, the system controller 11 sets the calculated optimum strategy in the write strategy circuit 9. Specifically, the system controller 11 sets optimum strategies calculated concerning the mark lengths 2T to 4T to be adjusted in the write strategy circuit 9.

In the example explained above, the measurement of evaluation values concerning the recordings for adjustment <1> to <3> (the trial writing at j=1) and the recordings for adjustment <4> to <6> (the trial writing at j=2) are separately performed every time each of the recordings is completed. However, naturally, it is also possible to, after collectively performing the recordings for adjustment <1> to <6>, collectively perform the evaluation value measurement concerning the recordings for adjustment <1> to <6> at a time as well (i.e., perform the evaluation value measurement according to one reproducing operation).

<5. Method of Deriving a Combination in which Interference of Evaluation Values is Little>

An example of a specific method for deriving the "combination in which interference of evaluation values is little" is explained below.

As a basic idea for deriving a combination in which interference of evaluation values is little, mark lengths having little interference of evaluation values when recording edge positions of plural mark lengths are moved are grouped in the same group.

For that purpose, combinations that could be considered as combinations of all mark lengths to be adjusted are set as group candidates in advance, an evaluation value obtained when strategy settings of mark lengths belonging to the group candidates is measured, and a candidate group in which interference of evaluation values is the least is derived with reference to the evaluation value. Specifically, in the deriving method in this case, among evaluation values obtained by the plural mark lengths are combined and shifted, only evaluation values as close as possible to evaluation values measured when individual marks are independently shifted as reference conditions are selected.

Figure 8:
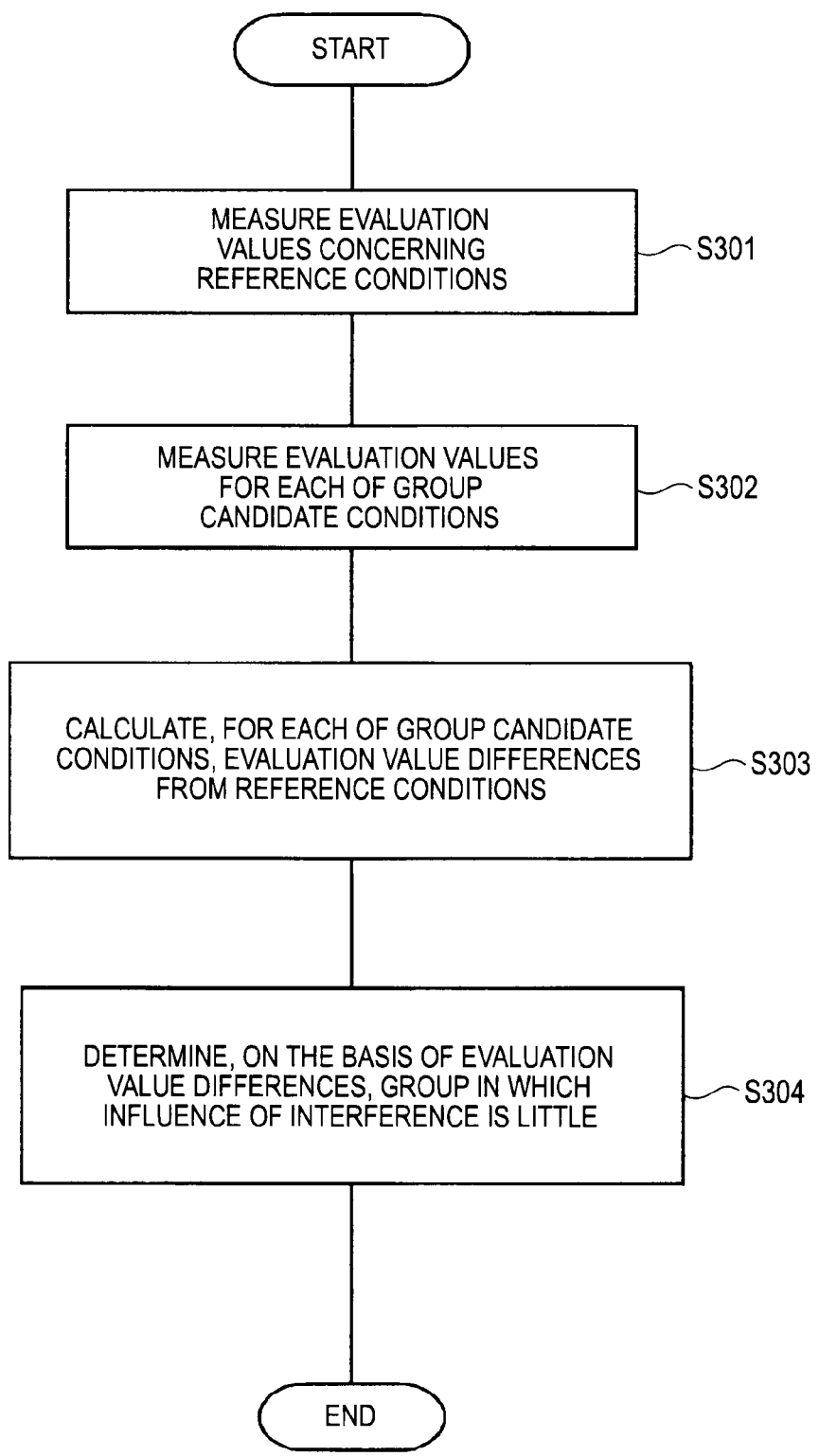
FIG. 8 is a flowchart for explaining a rough procedure for deriving a combination in which interference of evaluation values is little.

A flowchart of FIG. 8 indicates a rough procedure for the derivation.

In FIG. 8, the procedure for the derivation in this example can be roughly divided into steps S301 to S304.

First, in step S301, the system controller 11 performs evaluation value measurement concerning the reference conditions.

Evaluation values concerning the reference conditions specifically indicate evaluation values of mark edge positions at a start end and a terminal end of each of mark lengths to be adjusted obtained when recording edge positions at the start end and the terminal end of each of the mark lengths are independently changed concerning the individual mark lengths to acquire evaluation values of the mark edge positions at the start end and the terminal end of the individual mark lengths.

In the following explanation, a variable representing a distinction of mark lengths is put as "m" (in this case, 2 to 4) and a variable representing a distinction of the strategy settings ST is put as "n" (in this case, i=1 to 3).

A measurement result of evaluation values concerning a start end mark edge position is represented as ErF(m,n) and a measurement result of evaluation values concerning a terminal end mark edge position is represented as ErR(m,n). When mark lengths to be adjusted are three types 2T to 4T and recording conditions (strategy settings) are three types ST1 to ST3 as in the case of the embodiment, as the measurement values concerning the reference conditions, evaluation values described below are measured.

"Concerning the 2T mark",
ErF(2,1), ErR(2,1), ErF(2,2), ErR(2,2), ErF(2,3), and ErR(2,3)

"Concerning the 3T mark"
ErF(3,1), ErR(3,1), ErF(3,2), ErR(3,2), ErF(3,3), and ErR(3,3)

"Concerning the 4T mark"
ErF(4,1), ErR(4,1), ErF(4,2), ErR(4,2), ErF(4,3), and ErR(4,3)

Since the strategy settings during the derivation are set the same as the strategy settings during the actual adjustment, it is possible to obtain a more accurate combination corresponding to the actual adjustment as the "combination in which interference of evaluation values is little".

Subsequently, in step S302, the system controller 11 performs evaluation value measurement for each of group candidate conditions.

In the case of this example, as combinations that could be considered group candidates, all combinations are mechanically obtained. Specifically, in the case of this example, since the mark lengths to be adjusted are the three types 2T to 4T, combinations of the mark lengths are represented as $\Sigma_3 C_i$, where i is "2 to the number of mark lengths to be adjusted". In this case, i is 2 and 3. Note that i is "2 to the number of mark lengths to be adjusted" because an evaluation value measurement result at i=1 is the same as the evaluations values under the reference conditions.

Eventually, combinations that could be considered as group candidates are four types in total "2T, 3T", "2T, 4T", "3T, 4T", and "2T, 3T, 4T".

A variable representing a distinction of such group candidates is put as "l". Specifically, the variable l is set as follows:

| | |
|---|---|
| "2T, 3T" | l = 1, |
| "2T, 4T" | l = 2, |
| "3T, 4T" | l = 3, and |
| "2T, 3T, 4T" | l = 4. |

When evaluation values that should be measured for each of the group candidates l are represented as EcF(l,m,n) and EcR(l,m,n), in this case, the evaluation values that should be measured for each of the group candidates l are as described below.

"Concerning the group candidate of l=1"
m=2: EcF(1,2,1), EcR(1,2,1), EcF(1,2,2), EcR(1,2,2), EcF(1,2,3), EcR(1,2,3)
m=3: EcF(1,3,1), EcR(1,3,1), EcF(1,3,2), EcR(1,3,2), EcF(1,3,3), EcR(1,3,3)

"Concerning the group candidate of l=2"
m=2: EcF(2,2,1), EcR(2,2,1), EcF(2,2,2), EcR(2,2,2), EcF(2,2,3), EcR(2,2,3)
m=4: EcF(2,4,1), EcR(2,4,1), EcF(2,4,2), EcR(2,4,2), EcF(2,4,3), EcR(2,4,3)

"Concerning the group candidate of l=3"
m=3: EcF(3,3,1), EcR(3,3,1), EcF(3,3,2), EcR(3,3,2), EcF(3,3,3), EcR(3,3,3)
m=4: EcF(4,2,1), EcR(4,2,1), EcF(4,2,2), EcR(4,2,2), EcF(4,2,3), EcR(4,2,3)

"Concerning the group candidate of l=4"
m=2: EcF(4,2,1), EcR(4,2,1), EcF(4,2,2), EcR(4,2,2), EcF(4,2,3), EcR(4,2,3)
m=3: EcF(4,3,1), EcR(4,3,1), EcF(4,3,2), EcR(4,3,2), EcF(4,3,3), EcR(4,3,3)
m=4: EcF(4,4,1), EcR(4,4,1), EcF(4,4,2), EcR(4,4,2), EcF(4,4,3), EcR(4,4,3)

In short, the evaluation values that should be measured for each of the group candidates l are evaluation values concerning mark edge positions of mark lengths belonging to the group candidate obtained when strategy settings of the mark lengths are simultaneously changed. Specifically, in the case of this example, if l is 1, the evaluation values are only m=2, 3, if l is 2, the evaluation values are only m=2, 4, if l is 3, the evaluation values are only m=3, 4, and, if l is 4, the evaluation values are all of m=2, 3, 4.

In step S303, an evaluation value difference from the reference conditions is calculated for each of the group candidate conditions.

Specifically, for example, concerning the group candidate l=1, evaluation value differences described below are calculated.

EcF(1,2,1)−ErF(2,1), EcR(1,2,1)−ErR(2,1)
EcF(1,2,2)−ErF(2,2), EcR(1,2,2)−ErR(2,2)
EcF(1,2,3)−ErF(2,3), EcR(1,2,3)−ErR(2,3)
EcF(1,3,1)−ErF(3,1), EcR(1,3,1)−ErR(3,1)
EcF(1,3,2)−ErF(3,2), EcR(1,3,2)−ErR(3,2)
EcF(1,3,3)−ErF(3,3), EcR(1,3,3)−ErR(3,3)

In this way, concerning each of EcF (l,m,n) and EcR (l,m,n) measured for each of the group candidates, differences from the evaluation values ErF (m,n) and ErR (m,n) under the reference conditions corresponding to the evaluation value EcF(l,m,n) or EcR(l,m,n) are calculated.

Among the evaluation value differences calculated in this way, the evaluation value difference concerning the start end mark edge position is put as EdF(l,m,n) and the evaluation value difference concerning the terminal end mark edge position is put as EdR(l,m,n). The evaluation value differences EdF(l,m,n) and EdR(l,m,n) are represented by the formula as described below.

$$EdF(l,m,n)=EcF(l,m,n)-ErF(m,n)$$

$$EdR(l,m,n)=EcR(l,m,n)-ErR(m,n)$$

In the above formula, in the case of l=1, the evaluation values are only m=2, 3, in the case of l=2, the evaluation values are only m=2, 4, in the case of l=3, the evaluation values are only m=3, 4, and in the case of l=4, the evaluation values are m=2, 3, 4.

In step S304, the system controller 11 determines, on the basis of the evaluation value differences, a group in which the influence of interference is little.

Specifically, first, the system controller 11 adds up, for each of group candidates, values of the calculated evaluation value differences to obtain an evaluation index for each of the group candidates (hereinafter referred to as group candidate evaluation value Edsum(l)). Then, the system controller 11 determines the "combination in which interference of evaluation values is little" on the basis of a value of the group candidate evaluation value Edsum(l) calculated for each of the group candidates in this way.

The group candidate evaluation value Edsum(l) is represented by the formula as follows.

$$Edsum(l)=\Sigma\{EdF(l,m,n)+EdR(l,m,n)\}$$

In the formula of the group candidate evaluation value Edsum(l), as in the calculation of evaluation values and evaluation value differences, in the case of l=1, the evaluation values are only m=2, 3, in the case of l=2, the evaluation values are only m=2, 4, in the case of l=3, the evaluation values are only m=3, 4, and in the case of l=4, the evaluation values are m=2, 3, 4.

In the case of this example, as a group candidate in which interference of evaluation values is little, a group candidate in which the value of the group candidate evaluation value Edsum(l) calculated in this way is the minimum is selected. In this example, as the group candidate in which the value of the group candidate evaluation value Edsum(l) is the minimum in this way, "2T, 4T" of l=2 is derived. Mark length not included in the group candidate of l=2 among the mark lengths to be adjusted is only 3T. As a result, as the "combination in which interference of evaluation values is little", the set of "2T, 4T" and the set of "3T alone" are determined.

When there are four or more types of mark lengths to be adjusted, the "combination in which interference of evaluation values is little" could be a combination of group candidates including combinations of plural mark lengths. In that case, after group candidates in which the value of the group candidate evaluation value Edsum(l) is the minimum are selected, a group candidate in which the value of the group candidate evaluation value Edsum(l) is the minimum only has to be further selected out of group candidates including combinations of mark lengths other than mark lengths belonging to the selected group candidates.

In this embodiment, information concerning the "combination in which interference of evaluation values is little" derived as explained above is stored in individual recording and reproducing apparatuses in advance.

The recording and reproducing apparatus shown in FIG. 1 executes the strategy adjustment according to the embodiment explained above on the basis of the information concerning the "combination in which interference of evaluation values is little" stored in advance in this way (in the case of this example, information concerning the combination of "2T, 4T" and "3T").

It goes without saying that the recording and reproducing apparatus itself can derive the "combination in which interference of evaluation values is little" according to the procedure shown in FIG. 8.

In the above explanation, when the "combination in which interference of evaluation values is little" is derived, the group candidate in which the value of the group candidate evaluation value Edsum(l) is the minimum is selected. However, in particular, when there are four or more types of mark lengths to be adjusted, for example, a combination in which the value of the group candidate evaluation value Edsum(l) is quasi minimum and, therefore, the number of times of trial writing during adjustment is small may be selected.

In the above explanation, when the group candidate evaluation value Edsum(l) is calculated, the evaluation value differences (EdF(l,m,n), EdR(l,m,n)) are simply added up for each of the group candidates. However, for example, when importance of evaluation values is different for each of mark lengths, during the calculation of the group candidate evaluation value Edsum(l), different coefficients Cm can be given to the evaluation value differences EdF(l,m,n) and EdR(l,m,n) for each of the mark lengths as described below.

$$Edsum(l)=\Sigma\{Cm\cdot EdF(l,m,n)+Cm\cdot EdR(l,m,n)\}$$

<6. Modifications>

The embodiments are explained above. However, the present disclosure is not limited to the specific examples explained above. Various modifications are conceivable in the specific apparatus configuration, the processing procedure for the strategy adjustment, the setting of recording edge positions to be adjusted, the measuring method for evaluation values, and the like.

For example, as the evaluation values, besides sSAM, evaluation values defined as "mark edge position errors" in Patent Document 1 can also be used. Specifically, an error between a position of a cross point of a waveform of the reproduction signal sA and a predetermined slice level and an intermediate position of timing of a clock CK is measured.

Alternatively, for example, as described in Patent Document 1, with a mark edge position of a certain mark length (e.g., mark length not easily affected by intersymbol interference such as 5T or longer mark length) set as a reference, the evaluation values as the mark edge position errors may be obtained as differences from the mark edge position set as the reference.

In the above explanation, concerning the method of moving recording edge positions in learning the matrix C (the strategy settings ST1, ST2, and ST3), the initial strategy is excluded. However, the setting of the initial strategy may be one of the strategy settings ST.

In the above explanation, on the assumption that only the mutual interference between the edges positions on the start end side and the terminal end side of each of the mark lengths is taken into account as the mutual interference that should be taken into account in the strategy adjustment, there are q=2 types of recording edge positions to be adjusted. However, as described in Patent Document 1, taking into account the likelihood that interference due to adjustment of edge positions of different mark lengths occurs as the mutual interference, an optimum strategy can also be obtained for each of combinations of space lengths and mark lengths.

Specifically, for example, like the "second adjustment example" in Patent Document 1, after dividing the strategy settings ST into 2T, 3T, 4T, and 5T or larger, recording edge positions on the start end side that should be adjusted are classified into fifteen ways according to immediately preceding space lengths and immediately following mark lengths of the recording edge positions. Recording edge positions on the terminal end side are also classified into fifteen ways according to immediately preceding mark lengths and immediately following space lengths of the recording edge positions. The recording edge positions to be adjusted are q=30 types in total.

In this case, the matrix C is a matrix of 30×30.

In this case, the trial writing is performed in q+1=31 ways of strategy settings ST1 to ST31.

In the example explained above, the present disclosure is applied to, as the optical recording medium, the BD. However, the present disclosure can also be suitably applied to other optical recording media such as a CD (Compact Disc) and a DVD (Digital Versatile Disc).

The present disclosure contains subject matter related to that disclosed in Japanese Priority Patent Application JP 2010-147451 filed in the Japan Patent Office on Jun. 29, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording and reproducing apparatus comprising:
an optical head unit that irradiates a laser beam on an optical recording medium and performs writing and readout of information represented by marks and spaces on the optical recording medium;
a laser-driving-pulse generating unit that generates a laser driving pulse corresponding to information to be recorded, supplies the laser driving pulse to the optical head unit, and causes the optical head unit to execute laser beam irradiation for recording;
an evaluation-value measuring unit that measures, on the basis of a signal read out from the optical recording medium by the optical head unit, an evaluation value representing an error of an edge position of the mark; and
a control and calculating unit that causes the recording and reproducing apparatus to separately execute, concerning plural mark lengths to be adjusted among mark lengths of the laser driving pulse, for each of sets of mark lengths grouped in advance, trial writing with shift amounts of edge positions of a laser driving pulse concerning the mark lengths belonging to the set changed, causes the recording and reproducing apparatus to execute readout of a signal recorded by the execution of the trial writing, causes the evaluation value measuring unit to measure an evaluation value under setting of the respective shift amounts, and obtains, on the basis of the measured evaluation values, an optimum edge shift amount of the laser driving pulse for each of the mark lengths to be adjusted, wherein the control and calculating unit obtains the optimum edge shift amount through a calculation, when, concerning each of the sets of the grouped mark lengths, types of edges positions to be adjusted among edge positions of laser driving pulses concerning the mark lengths belonging to the set is put as q types (q is an integer equal to or larger than 2) and types of edge positions of the marks for which the evaluation values should be measured are put as p types (p is an integer equal to or larger than 2), and
a shift amount from an edge position set in advance as an initial strategy of the respective q types of edge positions is represented as vector w,
the evaluation value measured concerning the respective p types of edge positions of the marks is represented as vector m,
the evaluation value concerning the respective p types of edge positions of the marks measured in a setting state of the edge positions as the initial strategy is represented as $m_{init}$, and
interference sensitivity representing behavior of the evaluation values concerning the edge positions of the marks with respect to the shift amounts of the edge positions of the laser driving pulse is represented by a matrix C of p×q,
assuming that a relation represented by the following formula holds, $$m = Cw + m_{init}$$

the control and calculating unit causes the recording and reproducing apparatus to execute, concerning the edge positions, trial writings respectively in q+1 ways of setting states of shift amounts of the edge positions, causes the recording and reproducing apparatus to execute readout concerning each of signals recorded by the execution of the trial writing, causes the evaluation-value measuring unit to measure the evaluation values concerning the p types of edge positions of the marks, obtains the matrix C as the interference sensitivity and the evaluation value $m_{init}$ on the basis of the measured evaluation values and information concerning the q+1 ways of shift amounts concerning the edge positions, and then performs a calculation by the following formula using the evaluation value $m_{init}$ and an inverse matrix or a pseudo inverse matrix $C^{\#}$ of the interference sensitivity, $$w_0 = C^{\#} m_{init}$$

and obtains an optimum edge shift amount concerning the q types of edge positions.

2. The recording and reproducing apparatus according to claim 1, wherein the control and calculating unit causes the recording and reproducing apparatus to separately execute, for each of sets of mark lengths grouped to reduce interference of the evaluation values, trial writing with shift amounts of edge positions of a laser driving pulse concerning the mark lengths belonging to the set changed.

3. The recording and reproducing apparatus according to claim 2, wherein the grouping is performed concerning each of sets of plural mark lengths, which are combined as a candidate group, to reduce a difference between the evaluation values measured concerning the mark lengths when shift amounts of edge positions concerning the mark lengths belonging to the set are simultaneously changed and the evaluation values measured concerning the individual mark lengths when shift amounts of edge positions are independently changed concerning each of the plural mark lengths.

4. The recording and reproducing apparatus according to claim 1, wherein the plural mark lengths to be adjusted are three types of mark lengths 2 T (T represents channel bits), 3 T, and 4 T.

5. The recording and reproducing apparatus according to claim 4, wherein the control and calculating unit causes the recording and reproducing apparatus to separately execute, for a set of the mark lengths 2 T and 4 T and a set of the mark length 3 T alone, trial writing with shift amounts of edge position of a laser driving pulse concerning the mark lengths belonging to the sets.

6. A laser driving pulse adjusting method in a recording and reproducing apparatus including an optical head unit that irradiates a laser beam on an optical recording medium and performs writing and readout of information represented by marks and spaces on the optical recording medium, a laser-driving-pulse generating unit that generates a laser driving pulse corresponding to information to be recorded, supplies the laser driving pulse to the optical head unit, and causes the optical head unit to execute laser beam irradiation for recording, and an evaluation-value measuring unit that measures, on the basis of a signal read out from the optical recording medium by the optical head unit, an evaluation value representing an error of an edge position of the mark, the laser driving pulse adjusting method comprising:

causing the recording and reproducing apparatus to separately execute, concerning plural mark lengths to be adjusted among mark lengths of the laser driving pulse, for each of sets of mark lengths grouped in advance, trial writing with shift amounts of edge positions of a laser driving pulse concerning the mark lengths belonging to the set changed, causing the recording and reproducing apparatus to execute readout of a signal recorded by the execution of the trial writing, causing the evaluation value measuring unit to measure an evaluation value under setting of the respective shift amounts, and obtaining, on the basis of the measured evaluation values, an optimum edge shift amount of the laser driving pulse for each of the mark lengths to be adjusted; and obtaining the optimum edge shift amount through a calculation of the control and calculating unit, when, concerning each of the sets of the grouped mark lengths, types of edges positions to be adjusted among edge positions of laser driving pulses concerning the mark lengths belonging to the set is put as q types (q is an integer equal to or larger than 2) and types of edge positions of the marks for which the evaluation values should be measured are put as p types (p is an integer equal to or larger than 2), and a shift amount from an edge position set in advance as an initial strategy of the respective q types of edge positions is represented as vector w, the evaluation value measured concerning the respective p types of edge positions of the marks is represented as vector m, the evaluation value concerning the respective p types of edge positions of the marks measured in a setting state of the edge positions as the initial strategy is represented as $m_{init}$, and interference sensitivity representing behavior of the evaluation values concerning the edge positions of the marks with respect to the shift amounts of the edge positions of the laser driving pulse is represented by a matrix C of p×q, assuming that a relation represented by the following formula holds, $$m = Cw + m_{init}$$

the control and calculating unit causes the recording and reproducing apparatus to execute, concerning the edge positions, trial writings respectively in q+1 ways of setting states of shift amounts of the edge positions, causes the recording and reproducing apparatus to execute readout concerning each of signals recorded by the execution of the trial writing, causes the evaluation-value measuring unit to measure the evaluation values concerning the p types of edge positions of the marks, obtains the matrix C as the interference sensitivity and the evaluation value $m_{init}$ on the basis of the measured evaluation values and information concerning the q+1 ways of shift amounts concerning the edge positions, and then performs a calculation by the following formula using the evaluation value $m_{init}$ and an inverse matrix or a pseudo inverse matrix $C^{\#}$ of the interference sensitivity, $$w_0 = C^{\#} m_{init}$$

and obtains an optimum edge shift amount concerning the q types of edge positions.

* * * * *